United States Patent [19]

Lev et al.

[11] Patent Number: 4,704,846
[45] Date of Patent: Nov. 10, 1987

[54] APPARATUS FOR SORTING AND BUNCHING FLOWERS AND OTHER AGRICULTURAL PRODUCE

[75] Inventors: Monick Lev, Kfar Saba; Brois Frankstein, Holon, both of Israel

[73] Assignee: State of Israel-Ministry of Agriculture, Bet Dagan, Israel

[21] Appl. No.: 798,570

[22] Filed: Nov. 15, 1985

[30] Foreign Application Priority Data

Nov. 27, 1984 [IL] Israel ........................................ 73653

[51] Int. Cl.$^4$ ........................ B65B 13/02; B65B 63/00
[52] U.S. Cl. ............................................ 53/522; 53/582; 83/407; 83/435.2; 100/6; 209/703; 209/925
[58] Field of Search ................ 53/513, 515, 522, 582; 83/407, 409.2, 421, 435.2, 438, 732; 100/6; 198/836; 209/702, 703, 925

[56] References Cited

U.S. PATENT DOCUMENTS

| | | | |
|---|---|---|---|
| 2,682,288 | 6/1954 | Magnuson | 100/6 |
| 3,757,625 | 9/1973 | Pfenning | 83/435.2 |
| 4,041,672 | 8/1977 | Gularte | 83/409.2 X |
| 4,262,944 | 4/1981 | Branch | 53/515 X |
| 4,420,118 | 12/1983 | Gehlen | 83/407 |
| 4,442,765 | 4/1984 | Limehouse | 100/6 |

Primary Examiner—John Sipos
Attorney, Agent, or Firm—Alexander, Unikel, Zalewa & Tenenbaum, Ltd.

[57] ABSTRACT

Apparatus for bunching flowers and similar produce including a rotating endless belt defining a plurality of flower bunching locations on the surface thereof, at least one, and preferably a plurality of sorting tables adapted to be arranged adjacent the endless belt, stem trimming apparatus mounted adjacent the endless belt downstream of the sorting tables, stem cleaning apparatus mounted adjacent the endless belt downstream of the stem trimming apparatus, and tying means mounted adjacent the endless belt downstream of the leaf removing apparatus.

15 Claims, 7 Drawing Figures

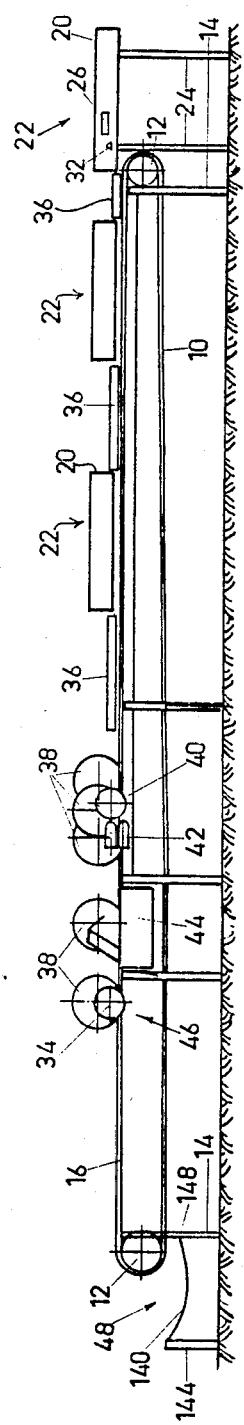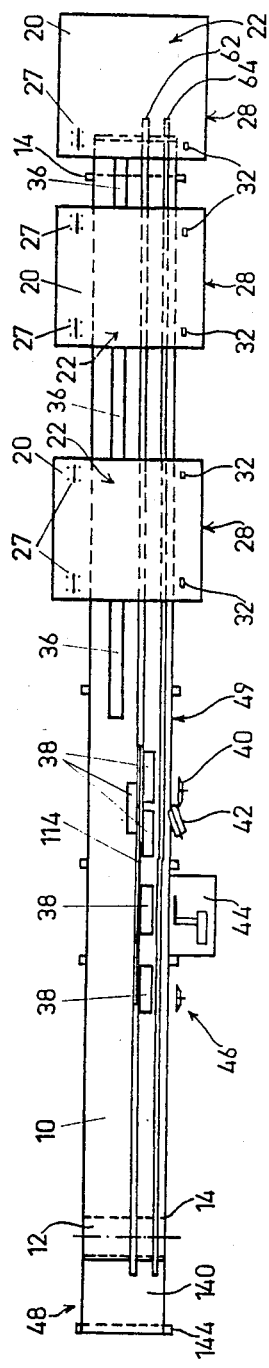

APPARATUS FOR SORTING AND BUNCHING FLOWERS AND OTHER AGRICULTURAL PRODUCE

FIELD OF THE INVENTION

The present invention relates to apparatus for sorting and bunching flowers and other produce.

BACKGROUND OF THE INVENTION

The sorting and bunching of flowers and other produce which must be sorted according to length is generally accomplished manually. The sorted bunches are then manually or automatically cleaned, tied and cut.

There exist on the market two devices for sorting and tying of flowers. One, made by SMITS b.v. Machinebouwen Transportbanden, Bergeyk, Holland, comprises first and second rotating endless belts, the second beginning beneath the end of the first. The apparatus further comprises bunching apparatus for receiving single flowers, bunching them in groups of ten, and depositing them in tied bunches on the second endless belt. The bunching apparatus comprises four rotating adjacent chains, each bearing a plurality of pin members which collect the desired number of single flowers and bunch them together.

Due to the fact that flowers are laid on the first rotating belt by the worker individually, the tied bunches are not neat and orderly and, therefore, require manual straightening at the end of the mechanical process. Furthermore, due to this fact that the rate of speed at which the apparatus processes the flowers, only a limited number of workers can work at the machine at one time and the machine's output is limited.

The second device is manufactured by Olimex b.v., Holland and comprises a plurality of troughs mounted on an endless rotating chain. Sorting tables are arranged above the troughs, each worker standing at a sorting table. This device is adapted to bunch 20 flowers taken from four consecutive troughs. Each group of 20 as it is collected from the troughs is tied and cut and falls onto a conveyer belt for removal. There is no cleaning of the flower stems.

Both these devices suffer from the disadvantage that flowers or produce of only one length can be bunched at any one time. Thus, all the workers at all the sorting tables must sort flowers of the same length at the same time, and flowers of different lengths must be returned to the pile to be sorted later.

SUMMARY OF THE INVENTION

It is an object of the present invention to provide apparatus for mechanically bunching flowers or similar produce which permits simultaneous bunching of flowers of different lengths.

It is a further object of the present invention to provide bunching apparatus which also removes the lower leaves from thej stems and which is less complex and more efficient than existing apparatus.

There is thus provided in accordance with the present invention apparatus for bunching flowers and similar produce including a rotating endless belt defining a plurality of flower bunching locations on the surface thereof, at least one, and preferably a plurality of sorting tables adapted to be arranged adjacent the endless belt, stem trimming apparatus mounted adjacent the endless belt downstream of the sorting tables, stem cleaning apparatus mounted adjacent the endless belt downstream of the stem trimming apparatus, and tying means mounted adjacent the endless belt downstream of the leaf removing apparatus.

According to a preferred embodiment of the invention, the endless belt includes a plurality of flexible divider elements mounted thereon and defining said plurality of flower bunching locations.

Further according to a preferred embodiment, there is also provided adjustable alignment apparatus mounted adjacent the endless belt and adjacent each sorting table.

Still further according to a preferred embodiment, the sorting tables each comprise a substantially planar work surface including adjustable measuring apparatus and counting apparatus, and defining sorted flower location and an incorrectly sized flower location. Preferably the sorting table further comprises a mobile C-shaped support frame upon which the work surface is mounted.

Further according to a preferred embodiment, the stem cleaning apparatus includes a pair of parallel rotating brush members mounted adjacent the endless belt whereby their longitudinal axes define an angle of 20 degrees or less with the longitudinal axis of the belt.

Additionally in accordance with a preferred embodiment the apparatus also includes apparatus for collecting bunches of tied flowers mounted adjacent the endless belt downstream of the apparatus for tying.

Still further in accordance with a preferred embodiment the apparatus further includes apparatus for adjusting the position of the endless belt relative to its rotating drum.

BRIEF DESCRIPTION OF THE DRAWINGS

The present invention will be further understood and appreciated from the following detailed description taken in conjunction with the drawings in which:

FIG. 1 is a side view illustration of bunching and tying apparatus constructed and operative in accordance with an embodiment of the present invention;

FIG. 2 is a top view illustration of bunching and tying apparatus constructed and operative in accordance with the embodiment of FIG. 1;

DETAILED DESCRIPTION OF THE INVENTION

Figure 3:
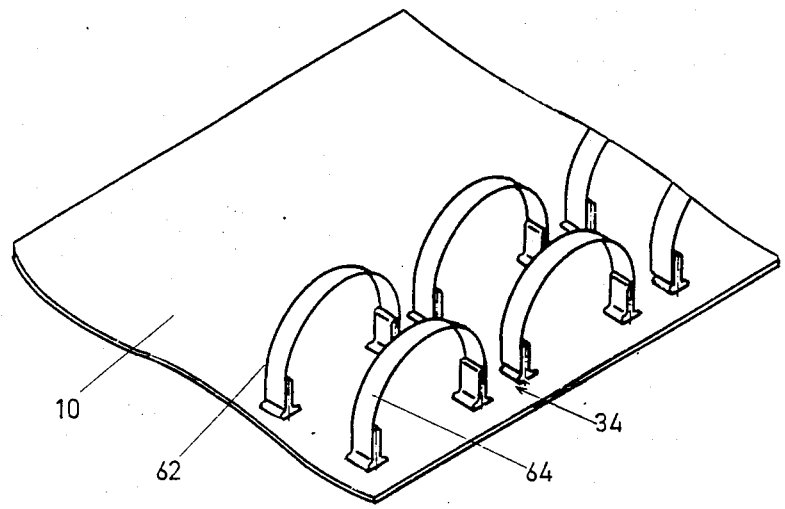
FIG. 3 is a perspective view of a portion of an endless belt including bunching locations constructed and operative in accordance with the embodiment of FIGS. 1 and 2.

Referring now to FIG. 1 there is shown a schematic illustration of apparatus for sorting and bunching produce constructed and operative in accordance with an embodiment of the present invention. While this apparatus is suitable for bunching any produce which is sorted and bunched according to length, it is particularly suited to the bunching of flowers, particularly carnations. Accordingly, the apparatus will be described hereinbelow with specific reference to sorting and bunching of flowers, although it is not limited to this use.

The bunching apparatus of the present invention comprises an endless rotating belt 10 mounted about conventional drums 12. Drums 12 are supported on legs 14 whereby belt 10 is maintained at a comfortable height for working. Belt 10 is further supported about a conventional frame 16. Slideably arranged adjacent one end of belt 10 is at least one sorting table 20. Preferably a plurality of sorting tables 20 are provided to permit several workers to sort produce for bunching at any one time.

Sorting table 20 comprises a substantially planar sorting surface 22 mounted upon a supporting frame 24 comprising a pair of C-shaped legs. Frame 24 is arranged for slideable insertion about belt 10 to permit a worker to stand or sit at the sorting table with sorting surface 22 located over belt 10. Thus, the sorting table can be moved back and forth until comfortably located for the worker and so that sorted flowers can easily be placed by the worker on the belt 10. Means for adjusting the angle of the sorting table are also preferably provided.

Mounted on sorting surface 22 is adjustable length measuring means 26. Length measuring means 26 may comprise a sheet of metal or any other material which is insertable as into apertures 27 located at predetermined distances from the edge 28 of the table 20 to permit sorting or produce by length, and is shown in detail in FIG. 2. According to a preferred embodiment, identical apertures 27 are located on both sides of the sorting surface 22 for ease of use by left-handed workers as well as right-handed workers. In addition, two workers can work at one sorting table 20, if desired. Alternatively, any other means of measuring length for sorting the produce may be provided.

Also mounted on sorting surface 22 is counting means 32. Counting means 32 may comprise any means permitting counting of the sorted produce into the desired size bunches. For instance, since ten flowers such as carnations are required in a bunch, means for counting 10 flowers is required when carnations are being sorted.

Defined on belt 10 are a plurality of bunching locations 34, each arranged to contain one sorted bunch of produce. Slideably mounted in frame 16 adjacent and downstream of each sorting table 20 is adjustable alignment apparatus 36. Alignment apparatus 36 extends partially onto belt 10 and indicates the farthest point on the belt to which the bunched produce of that length should extend.

Downstream of alignment apparatus 36, stem trimming means 40, such as a circular saw, is mounted on frame 16. Stem trimming means 40 serves to trim the stems of all the produce in the bunch to the same length, preferably somewhat longer than the desired final length, to permit efficient cleaning and tying of the bunch without interference from protruding stems.

Mounted in frame 16 downstream of the stem trimming means 40 is apparatus for cleaning the stems and removing leaves 42. Stem cleaning apparatus 42 comprises a pair of rotating brushes, preferably mounted at an angle of 20 degrees or less to the longitudinal axis of the belt 10.

Tying apparatus 44 is mounted in frame 16 or arranged free-standing adjacent belt 10 downstream of stem cleaning apparatus 42. Tying apparatus 44 may comprise any conventional means for tying sorted and trimmed bunches of produce. Suitable tying apparatus is the Universal Elasticbinder Model EM 15 manufactured by Cyklop Export GmbH & Co. KG, Koln, Germany. A second stem trimming apparatus 46, such as a second circular saw, is provided downstream of tying means 44 to re-trim the stems to their desired final length.

A plurality of retaining elements 38 are coupled to frame 16. Retaining elements 38 serve to hold the stems of the produce and prevent movement thereof during trimming and cleaning of the stems. Accordingly, a retaining element 38 is mounted opposite stem trimming means 40, three retaining elements 38 offset from one another are mounted adjacent the stem cleaning means 42 to hold the produce during the entire cleaning step, and one retaining element 38 is mounted opposite each of the tying apparatus 44 and the second stem trimming means 46.

Apparatus for collecting tied bunches 48 may be provided adjacent the downstream end of belt 10. As belt 10 passes about drum 12, the tied bunches of flowers fall off the belt and are collected in apparatus 48.

Operation of the apparatus of FIG. 1 is as follows. A pile of flowers to be sorted is placed on sorting surface 22. The desired length of flowers for the bunch is determined and apparatus for measuring 26 and alignment apparatus 36 are adjusted accordingly. A single flower is removed by the worker, examined to be sure it is healthy and measured against measuring apparatus 26. If the flower is not of the desired length, it is placed on surface 22 in a pile for later re-sorting. If the flower is of the desired length, it is counted on counting means 32 and placed on surface 22 in a counted pile. Individual flowers are examined, measured and counted in this fashion until ten flowers lie in the counted pile.

The ten flowers which have been sorted and counted are placed on belt 10 in one of the bunching locations 34 with the flower heads adjacent alignment apparatus 36. As belt 10 rotates, the bunch of flowers moves under retaining means 38 and is held in place while stem trimming apparatus 40 cuts the stems to an even length, somewhat longer than the desired final length. The cut stems are now cleaned by passing between the rotating brushes of cleaning apparatus 42.

The bunch of flowers with its cut and cleaned stems now passes through the tying apparatus 44 where the stems are tied. The tied bunch now passes second stem trimming apparatus 46 where the stems are trimmed to their final length, and then the bunch is ready for wrapping in a plastic sleeve and collecting. The tied bunches may be removed manually from belt 10, or the bunches may be permitted to fall into collecting apparatus 48 from which they will later be removed.

Referring to FIG. 2 there is shown sorting and bunching apparatus according to the present invention comprising an endless belt 10. A plurality of sorting tables 20 including measuring means 26 are arranged adjacent belt 10 for sorting produce of different lengths. Alignment apparatus 36 is associated with each sorting table 20. As can be seen in FIG. 2, alignment apparatus 36 is adjustable in accordance with the measured length of the produce whereby the stems of the produce always extend beyond the opposite edge 49 of belt 10.

It is a particular feature of the present invention that bunches of flowers of different lengths can be sorted and bunched simultaneously. It will be appreciated that the only part of the process which depends on length of the flowers is the initial step of measuring. Stem trimming, cleaning and tying can be accomplished with stems of any length as long as the ends of the stems project from the front edge 49 of the belt 10. Thus, when several sorting tables 20 are provided, each worker can adjust the measuring apparatus 26 on his table 20 and the alignment apparatus 36 adjacent thereto to a different length. Furthermore, each worker can bunch flowers of different lengths without stopping the bunching machine, i.e., when all the flowers of one length on his table have been bunched, he can change the measuring apparatus 26 and alignment apparatus 36 at his sorting table 20 and proceed to resort his remaining flowers. Thus, flowers of several different lengths can be sorted, trimmed and tied at the same time, which is not possible on existing bunching machines. Similarly, flowers of different colors can be bunched separately simultaneously on the apparatus of the invention due to the fact that all the flowers in the bunch are placed simultaneously in one bunched produce location for cleaning, tying and cutting as a group.

Referring now to FIG. 3 there is shown in perspective illustration a portion of endless belt 10 defining bunching locations constructed and operative in accordance with a preferred embodiment of the invention. The belt comprises an endless sheet 60 of plastic material to which are affixed a plurality of flexible divider elements 62 and 64. Divider elements 62 comprise hoop members arranged to contain the flowers or the heads of the produce between adjacent divider elements. Divider elements 64 comprise hoop members preferably mounted coaxially with divider elements 62. Divider elements 64 are arranged to receive the stems of the produce between adjacent hoops. The hoop members are provided to retain the stems in a confined space while they are trimmed and tied. Divider elements 62 and 64 may comprise any flexible plastic material, such as PVC.

According to one alternative embodiment, only hoop member divider elements 64 are provided on the surface of belt 10, the upper portion of the produce being held by retaining elements 38. According to another alternative embodiment, two parallel rows of hoop member divider elements 64 are provided. This embodiment insures that the produce will be held perpendicular to the belt at all times.

Figure 4:
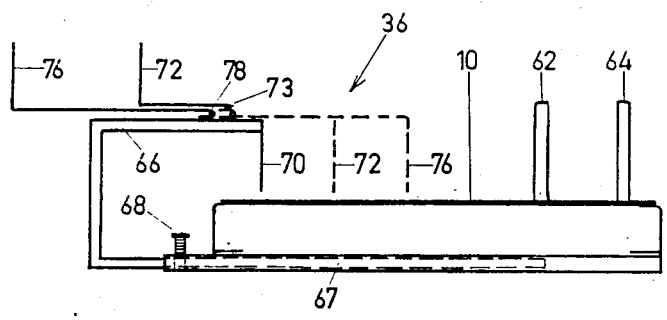
FIG. 4 is a side sectional illustration of adjustable alignment apparatus for mounting adjacent the endless belt of FIG. 3

With reference to FIG. 4 there is shown alignment apparatus 36 constructed and operative in accordance with a preferred embodiment of the present invention and comprising a base 66 arranged for slideable engagement with a frame 67 supporting the rotating belt 10. Sliding motion of base 66 within frame 67 permits adjustment of the location of the alignment apparatus relative to the belt surface. Base 66 may be locked in place as by bolt 68.

Mounted upon base 66 is a first alignment surface 70. Preferably the upstream edge of surface 70 is slightly angled to prevent flower heads from hitting the cut edge of the surface. First alignment surface 70 may comprise any suitable material, such as metal. A second alignment surface 72, of similar construction, is rotatably mounted on base 66 as about hinge 73. Rotation of second surface 72 provides an alignment surface extending further over the rotating belt to accomodate shorter flowers. Optionally, a third alignment surface 76, of similar construction, may be rotatably mounted on base 66 as about hinge 78. In this case, upon rotation of second surface 72, third alignment surface 76 would be raised, as illustrated in broken lines. Further rotation of third alignment surface 76 provides an alignment surface extending still further over the rotating belt to accomodate even shorter flowers.

Figure 5:
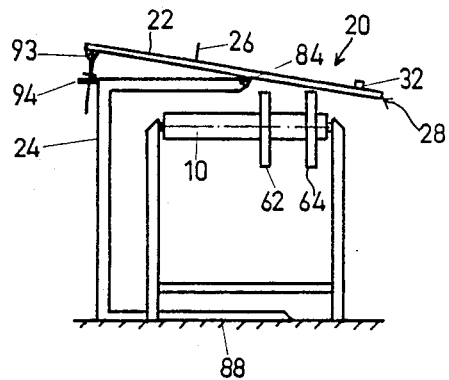
FIG. 5 is a side sectional illustration of a sorting table constructed and operative in accordance with the embodiment of FIGS. 1 and 2.

Referring now to FIG. 5 there is shown in side section a sorting table 20 constructed and operative in accordance with a preferred embodiment of the present invention. Sorting table 20 comprises a generally planar sorting surface 22 pivotably mounted as about pin 84 on a C-shaped frame 24 including leg elements 88. Sorting table 20 is arranged for movement adjacent rotating belt 101 which includes divider elements 62 and 64 as illustrated in FIG. 3. Leg elements 88 of frame 24 slide underneath the frame of belt 10 to the extent necessary to place sorting surface 22 in a comfortable orientation for a worker.

It is a particular feature of the sorting table of the present invention that a worker can sit at the table and work without bumping his legs against the table frame. It is a further particular feature that the angle of sorting surface 22 can be adjusted for the comfort of the worker. The rear edge of surface 22 is pivotably coupled to means for raising the edge relative to the frame such as a screw member 93 and associated nut 94 affixed to frame 24.

Affixed to sorting surface 22 are measuring means 2 and counting means 32. Any conventional measuring means may be utilized including measuring means as described with reference to FIG. 1.

Figure 6:
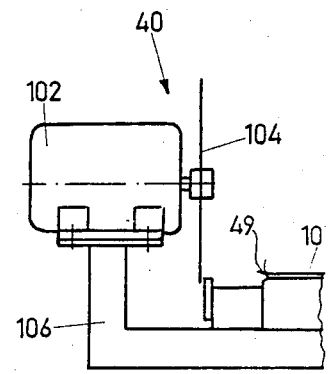
FIG. 6 is a side sectional illustration of apparatus for trimming stems operative in accordance with the embodiment of FIGS. 1 and 2.

There is illustrated in FIG. 6 stem trimming means 40 operative in accordance with the present invention. Stem trimming means 40 comprises a motor 102 and a circular saw 104 coupled and driven in relation to the motor. The stem trimming means 40 is mounted on the frame 106 supporting the rotating belt 10 and is arranged to cut only stems which protrude a predetermined distance from the edge 49 of belt 10.

FIG. 2 illustrates retaining means 38 constructed and operative in accordance with the present invention. This retaining means 38 comprises a plurality of flexible disks preferably comprising foam rubber or other spongy material. The disks are rotatably mounted on a track 114 with their edges engaging the rotating belt 10 for rotation therewith. As discussed above with reference to FIG. 2, the disks are located adjacent the cutting, tying and cleaning devices. Preferably, a pair of disks are mounted adjacent the rotating brushes of the stem cleaning apparatus, one wheel of the pair being offset from the other, to provide consistent and continuous retention of the produce during cleaning.

Figure 7:
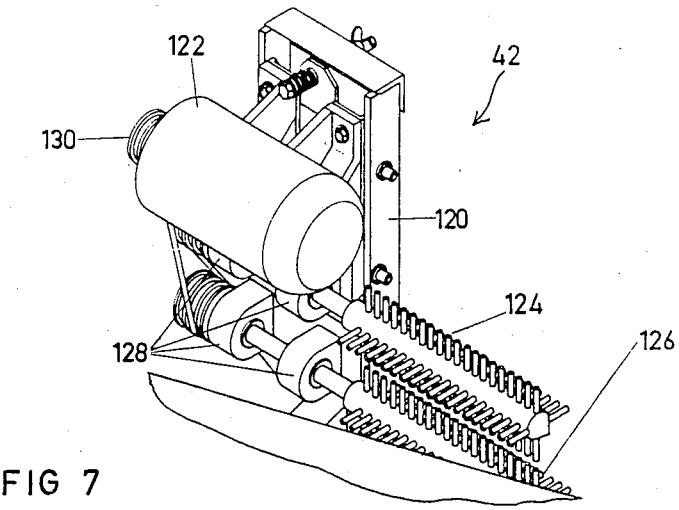
FIG. 7 is a perspective view of apparatus for stem cleaning and removing leaves constructed and operative in accordance with the embodiment of FIGS. 1 and 2.

With reference to FIG. 7 there is shown apparatus 42 for cleaning stems constructed and operative in accordance with a preferred embodiment of the present invention and comprising a frame 120, a motor 122 mounted in the frame, a pair of brush members 124 and 126 rotatably mounted in bearings 128 coupled to the frame, and transmission means 130 coupling the motor to the brush members for driving the brush members at a selectable speed. Transmission means 130 preferably comprises a series of belt wheels permitting three selectable speeds of rotation of the brush members for use depending upon the type of produce to be cleaned. Motor 122 may be any conventional motor which is operative together with the transmission means to drive the brush members.

Brush members 124 and 126 each comprise an elongate member arranged for rotation about its longitudinal axis and a plurality of flexible radially protruding finger elements extending therefrom. Finger elements preferably comprise rubber. Suitable brush members are produced, for example, by Zwapak Aalsmeer, Holland. Transmission means 130 is coupled to brush members 124 and 126 in such a way as to cause them to rotate in opposite directions. This countermotion serves to strip leaves and other debris from the stems of produce passing between the rotating brushes. According to a preferred embodiment, there is also provided means for adjusting the distance between the brushes (not shown) in order to accomodate produce having more or fewer leaves to be removed.

It is a particular feature of the present invention that the brush members 124 and 126 are mounted so as to define a preferred angle of about 20 degrees or less with the longitudinal axis of the rotating belt and the plane of the stem trimming saw blade. Brush members in existing cleaning machines are mounted at an angle of 45 degrees to the belt, which is also operative in the present apparatus. However, mounting brushes at this angle provides a relatively short cleaning time, that is, the stems pass quickly between the brushes. What is desired is to maximize the cleaning time, i.e., the time the stems are between the brushes, while providing the best angle of entry of the stems therebetween so as to avoid damaging the stems. This angle is now believed to be about 20 degrees.

It is a further particular feature that the tips of the brush members extend somewhat over the edge of the belt for more complete cleaning. A suitable groove is made in the frame supporting the belt to permit access to the stems at the edge without damaging the brush members.

Referring now to FIG. 1 there is shown apparatus for collecting tied bunches. The apparatus comprises a sheet 140 of web material coupled to a frame. This frame comprises two upstanding legs 144 coupled by a plurality of cross bars about which one end of sheet 140 is releasably affixed. The other end of sheet 140 is releasably affixed to cross bars 148 which may be affixed to the supporting legs of the endless belt, as illustrated, or which may be free standing as are legs 144. Reinforcing side bars may be provided.

According to one preferred embodiment, sheet 140 defines a rod receiving pocket at each end thereof. One of the cross bars is slideably removed from legs 144, the particular bar depending upon the volume of collecting space desired on sheet 140. The bar is replaced by sliding it through the rod receiving pocket in one end of sheet 140, which is placed between legs 144 for this purpose. The other edge is similarly affixed to one of cross bars 148, thereby providing a firmly supported collecting surface.

It will be appreciated that the present invention is not limited to what has been shown and described hereinabove merely by way of example. Rather, the scope of the invention is defined solely by the claims which follow.

We claim:

1. Apparatus for simultaneously sorting and bunching flowers and similar produce of different lengths comprising:
    a frame;
    an endless belt mounted for rotation on said frame and comprising a plurality of hoop shaped flexible divider elements mounted on the surface thereof, adjacent divider elements defining a plurality of bunched produce locations on the surface of said belt;
    a plurality of sorting tables for sorting said produce each adapted to be arranged adjacent the endless belt, there being mounted on said frame downstream of each said sorting tables an associated adjustable alignment means for aligning the sorted produce;
    first bunch stem trimming means mounted on said frame downstream of said tables;
    bunch stem cleaning means mounted on said frame downstream of the stem trimming means;
    bunch tying means coupled to said frame downstream of the stem cleaning means; and
    second bunch stem trimming means mounted on said frame downstream of said tying means,
    wherein a sorting operation can be performed simultaneously on different length produce at each of said plurality of sorting tables independently of the operation at another one thereof, said sorting operation being performed in accordance with the alignment means adjustment of the associated sorting table.

2. Apparatus according to claim 1 and wherein said bunch stem cleaning means comprises rotating brush means arranged with its longitudinal axis defining an angle of about 20 degrees with the longitudinal axis of said belt.

3. Apparatus for sorting and bunching flowers and similar produce comprising:
    a frame;
    an endless belt mounted for rotation on said frame and comprising a plurality of hoop shaped flexible divider elements mounted on the surface thereof, adjacent divider elements defining a plurality of bunched produce locations on the surface of said belt;
    at least one sorting table adapted to be arranged adjacent the endless belt, there being mounted on said frame downstream of said sorting table at least one adjustable alignment means;
    first bunch stem trimming means mounted on said frame downstream of said at least one sorting table;
    bunch stem cleaning means mounted on said frame downstream of the stem trimming means, said bunch stem cleaning means comprising rotating brush means arranged at approximately twenty degrees to the longitudinal axis of said belt;
    bunch tying means coupled to said frame downstream of the stem cleaning means; and
    second bunch stem trimming means mounted on said frame downstream of said tying means,
    wherein said adjustable alignment means comprises:
    a base coupled to said frame;
    a first alignment surface mounted on said base; and
    a second alignment surface rotatably mounted on said base for rotation over said first alignment surface.

4. Apparatus according to claim 3 and wherein the upstream edges of said first and second alignment surfaces are slightly angled.

5. Apparatus according to claim 3 and further comprising a third alignment surface rotatably mounted on said second alignment surface for rotation over said first and second alignment surfaces.

6. Apparatus according to claim 3 and wherein said at least one sorting table comprises a plurality of sorting tables and said at least one adjustable alignment means comprises a plurality of adjustable alignment means, each of said alignment means being mounted adjacent and downstream of one of said plurality of sorting tables.

7. Apparatus according to claim 3 and wherein said at least one sorting table comprises a substantially planar sorting surface pivotably coupled to a movable C-shaped support frame.

8. Apparatus according to claim 7 and further comprising adjustable produce length measuring means coupled to said sorting surface.

9. Apparatus according to claim 7 and further comprising produce counting means coupled to said sorting surface.

10. Apparatus according to claim 1 and further comprising means for collecting bunches of tied produce mounted adjacent the endless belt downstream of the means for tying.

11. Apparatus for sorting and bunching flowers and similar produce comprising:
a frame;
an endless belt mounted for rotation on said frame and comprising a plurality of flexible divider elements mounted on the surface thereof, adjacent divider elements defining a plurality of bunched produce locations on the surface of said belt;
at least one sorting table adapted to be arranged adjacent the endless belt and comprising:
a C-shaped support frame;
a substantially planar sorting surface pivotably coupled to said frame;
adjustable produce length measuring means coupled to said sorting surface; and
produce counting means coupled to said sorting surface;
first bunch stem trimming means mounted on said frame downstream of said at least one sorting table;
bunch stem cleaning means mounted on said frame downstream of the stem trimming means and comprising:
a cleaning means frame;
a motor mounted in the cleaning means frame;
a pair of parallel brush members mounted in said cleaning means frame and extending adjacent said belt whereby their longitudinal axes define an angle of about 20 degrees with the longitudinal axis of the belt; and
transmission means coupling said motor in driving relationship with said brush members;
bunch tying means coupled to said frame downstream of the stem cleaning means; and
second bunch stem trimming means mounted on said frame downstream of said tying means.

12. Apparatus according to claim 11 and wherein said length measuring means comprises a sheet of rigid material coupleable to one of at least two locations on said sorting surface.

13. Apparatus according to claim 11 and wherein said counting means comprises mechanical counting means.

14. Apparatus according to claim 11 and wherein said counting means comprises electro-mechanical counting means.

15. Apparatus according to claim 11 and further comprising adjustable alignment apparatus associated therewith.

* * * * *

UNITED STATES PATENT AND TRADEMARK OFFICE
CERTIFICATE OF CORRECTION

PATENT NO. : 4,704,846

DATED : November 10, 1987

INVENTOR(S) : Monick Lev and Boris Frankstein

It is certified that error appears in the above-identified patent and that said Letters Patent is hereby corrected as shown below:

On the title page inventors should read

--(75) Inventors: Monick Lev, Brois Frankstein --.

Signed and Sealed this

Tenth Day of May, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,704,846

DATED : November 10, 1987

INVENTOR(S) : Monick Lev and Boris Frankstein

It is certified that error appears in the above-identified patent and that said Letters Patent is hereby corrected as shown below:

On the title page inventor should read

-- (75) Inventors: Monick Lev, Boris Frankstein --.

This certificate supersedes Certificate of Correction issued May 10, 1988.

Signed and Sealed this

Thirtieth Day of August, 1988

*Attest:*

DONALD J. QUIGG

*Attesting Officer*      *Commissioner of Patents and Trademarks*